United States Patent [19]
Edwards et al.

[11] Patent Number: 4,906,054
[45] Date of Patent: Mar. 6, 1990

[54] ENDLESS TRACK DRIVE SYSTEM

[75] Inventors: John W. Edwards, Brandon; Daniel R. Harper; Quinton B. McNew, both of Fort Myers, all of Fla.

[73] Assignee: Edwards, Harper, McNew & Company, Fort Myers, Fla.

[21] Appl. No.: 51,830

[22] Filed: May 20, 1987

Related U.S. Application Data

[63] Continuation-in-part of Ser. No. 49,819, May 14, 1987, Pat. No. 4,861,120.

[51] Int. Cl.⁴ .................... B62D 55/08; B62D 55/12
[52] U.S. Cl. ............................... 305/35 EB; 305/38; 305/54; 305/56
[58] Field of Search ................. 305/12, 35 R, 35 EB, 305/37, 38, 39, 40, 41, 46, 51, 54, 55, 57; 474/201, 205, 237, 240, 242

[56] References Cited

U.S. PATENT DOCUMENTS

| | | |
|---|---|---|
| 296,998 | 4/1884 | Page . |
| 394,335 | 12/1888 | Chase . |
| 893,787 | 7/1908 | Conklin . |
| 905,405 | 12/1908 | Britton . |
| 1,217,007 | 2/1917 | Jory . |
| 1,400,100 | 12/1921 | Reddaway . |
| 1,420,531 | 6/1922 | Dutkiewicz et al. . |
| 1,507,458 | 9/1924 | Dreyer ................... 305/40 |
| 1,693,833 | 12/1928 | Worley . |
| 1,789,084 | 1/1931 | Schwarz . |
| 1,814,046 | 7/1931 | Kegresse . |
| 1,821,196 | 9/1931 | Worley ............... 305/38 X |
| 1,862,784 | 6/1932 | Choate . |
| 1,895,241 | 1/1933 | Worley . |
| 1,898,035 | 2/1933 | Diamond . |
| 1,911,184 | 5/1933 | Flynn . |
| 1,973,214 | 9/1934 | Lamb . |
| 1,975,726 | 10/1934 | Martinage . |
| 2,025,007 | 12/1935 | Wendling . |
| 2,037,983 | 4/1936 | Johnston . |
| 2,116,834 | 5/1938 | Kegresse . |
| 2,290,109 | 7/1942 | Mayne . |
| 2,309,648 | 2/1943 | Kelly . |
| 2,318,992 | 5/1943 | Gray .................... 305/38 |

(List continued on next page.)

FOREIGN PATENT DOCUMENTS

| | | |
|---|---|---|
| 922346 | 3/1973 | Canada . |
| 948243 | 5/1974 | Canada . |
| 473073 | 3/1929 | Fed. Rep. of Germany . |

(List continued on next page.)

OTHER PUBLICATIONS

Caterpillar Brochure, "CAT Challenger 65", Feb., 1987, 10 pages.
MaCarthur Press (Books) Pty. Ltd., "Blackwoods General Catalogue", published in Australia in 1979, p. 841.

(List continued on next page.)

Primary Examiner—Russell D. Stormer
Attorney, Agent, or Firm—Oliff & Berridge

[57] ABSTRACT

An endless track drive system for use on a track vehicle such as a bulldozer includes a plurality of polymeric endless track drive members integrally interconnected in a closed loop to form an endless track, each drive member including at least one frictional drive face, and at least one continuous reinforcement member encased within and further interconnecting the plurality of drive members. Each drive member of the endless track preferably includes at least two lateral frictional drive faces sloping inwardly with respect to a transverse direction of the endless track for engagement with a drive wheel. The endless track also preferably includes tread members which are either integrally formed with, bonded to or removably fastened to the drive members, and the tread members may be bias-ply, fiber reinforced or cable reinforced. The drive wheel preferably is provided with drive surfaces shaped to match the shape of the lateral drive faces on the drive members and/or a sprocket for engaging with additional drive faces on the drive members. The endless track drive system also preferably includes a scraper for scraping dirt and debris from the endless track and/or the drive wheel.

36 Claims, 5 Drawing Sheets

U.S. PATENT DOCUMENTS

| | | |
|---|---|---|
| 2,322,466 | 6/1943 | Perry . |
| 2,338,817 | 1/1944 | Mayne . |
| 2,342,953 | 2/1944 | Mayne . |
| 2,345,763 | 4/1944 | Mayne . |
| 2,350,076 | 5/1944 | Smith et al. . |
| 2,374,240 | 4/1945 | Shankman . |
| 2,376,802 | 5/1945 | Morse . |
| 2,387,802 | 10/1945 | Mayne . |
| 2,410,507 | 11/1946 | Knight . |
| 2,412,122 | 12/1946 | Campbell . |
| 2,449,421 | 9/1948 | Slemmons et al. . |
| 2,476,460 | 7/1949 | Smith . |
| 2,476,828 | 7/1949 | Skromme . |
| 2,487,813 | 11/1949 | Knox . |
| 2,531,111 | 11/1950 | Daniels .............................. 305/12 X |
| 2,537,745 | 1/1951 | Daniels . |
| 2,541,177 | 2/1951 | Slemmons . |
| 2,592,541 | 4/1952 | Curtis . |
| 2,592,916 | 4/1952 | Leguillon . |
| 2,608,875 | 9/1952 | Ellison et al. . |
| 2,728,612 | 12/1955 | Howe et al. . |
| 2,732,265 | 1/1956 | Cuthbertson . |
| 2,733,965 | 2/1956 | Gladden . |
| 2,796,303 | 6/1957 | Atkinson ............................... 305/37 |
| 2,803,504 | 8/1957 | Lynch ..................................... 305/37 |
| 2,823,082 | 2/1958 | Bauer, Jr. . |
| 2,845,308 | 7/1958 | Woltemar . |
| 2,900,210 | 8/1959 | Parsons . |
| 2,984,120 | 5/1961 | Hurry ................................... 474/205 |
| 3,013,844 | 12/1961 | Mazzarins . |
| 3,019,062 | 1/1962 | Long . |
| 3,068,711 | 12/1962 | Even . |
| 3,093,006 | 6/1963 | Gamaunt . |
| 3,104,113 | 9/1963 | Montz . |
| 3,105,390 | 10/1963 | Funke et al. . |
| 3,118,709 | 1/1964 | Case . |
| 3,250,577 | 5/1966 | Olson . |
| 3,346,306 | 10/1967 | Siber ..................................... 305/40 |
| 3,373,067 | 3/1968 | Hagstrom . |
| 3,439,959 | 4/1969 | Bowen et al. . |
| 3,451,728 | 6/1969 | Bruneau . |
| 3,480,339 | 11/1969 | Kell . |
| 3,567,291 | 3/1971 | Paulson . |
| 3,604,763 | 9/1971 | Maguire . |
| 3,606,497 | 9/1971 | Gilles . |
| 3,606,921 | 9/1971 | Grawey . |
| 3,618,384 | 11/1971 | Bierlein . |
| 3,625,574 | 12/1971 | Plastino . |
| 3,630,580 | 12/1971 | Grawey et al. . |
| 3,645,586 | 2/1972 | Piepho . |
| 3,703,321 | 11/1972 | Schoonover . |
| 3,734,576 | 5/1973 | Heiple et al. . |
| 3,736,032 | 5/1973 | Mosshart et al. . |
| 3,758,171 | 9/1973 | Plastino . |
| 3,771,844 | 11/1973 | Perreault . |
| 3,773,394 | 11/1973 | Grawey . |
| 3,808,901 | 5/1974 | Berg . |
| 3,857,617 | 12/1974 | Grawley . |
| 3,880,478 | 4/1975 | Baylor . |
| 3,888,132 | 6/1975 | Russ, Sr. . |
| 3,899,219 | 8/1975 | Boggs . |
| 3,899,220 | 8/1975 | Grawey et al. . |
| 3,900,231 | 8/1975 | Ohm . |
| 3,955,855 | 5/1976 | Massieon et al. . |
| 4,023,865 | 5/1977 | Morissette . |
| 4,093,318 | 6/1978 | Edwards . |
| 4,145,092 | 3/1979 | Kasin . |
| 4,175,796 | 11/1979 | Boggs et al. . |
| 4,198,103 | 4/1980 | Ward et al. ................ 305/35 EB X |
| 4,203,633 | 5/1980 | Hare . |
| 4,217,006 | 8/1980 | Dehnert . |
| 4,281,882 | 8/1981 | van der Lely . |
| 4,349,234 | 9/1982 | Hartmann . |
| 4,359,248 | 11/1982 | Kortering ......................... 305/54 X |
| 4,362,340 | 12/1982 | van der Lely . |
| 4,365,965 | 12/1982 | Russ, Sr. . |
| 4,410,219 | 10/1983 | van der Lely . |
| 4,448,273 | 5/1984 | Barbieri . |
| 4,449,958 | 5/1984 | Conrad . |
| 4,452,496 | 6/1984 | van der Lely . |
| 4,470,641 | 9/1984 | Swarthout ......................... 305/54 X |
| 4,473,366 | 9/1984 | Cataldo . |
| 4,484,903 | 11/1984 | Schneider . |
| 4,504,342 | 3/1985 | Marsh et al. ..................... 474/205 X |
| 4,569,561 | 2/1986 | Edwards et al. . |
| 4,579,547 | 4/1986 | McComber et al. . |
| 4,594,846 | 1/1986 | Livesay et al. . |
| 4,595,387 | 6/1986 | Frazier et al. . |
| 4,611,860 | 9/1986 | Wohlford et al. . |
| 4,616,883 | 10/1986 | Edwards et al. . |
| 4,618,190 | 10/1986 | Garman et al. . |
| 4,636,014 | 1/1987 | Dennison et al. . |
| 4,637,665 | 1/1987 | Burdick et al. . |
| 4,642,080 | 2/1987 | Takano et al. . |
| 4,650,444 | 3/1987 | Sakakibara et al. . |
| 4,721,498 | 1/1988 | Grob ..................................... 474/261 |

FOREIGN PATENT DOCUMENTS

| | | |
|---|---|---|
| 1149255 | 12/1960 | Fed. Rep. of Germany . |
| 1918554 | 7/1965 | Fed. Rep. of Germany . |

(List continued on next page.)

FOREIGN PATENT DOCUMENTS

| | | | |
|---|---|---|---|
| 3319067 | 11/1984 | Fed. Rep. of Germany . | |
| 710824 | 10/1931 | France . | |
| 60756 | 1/1955 | France | 305/38 |
| 1117612 | 5/1956 | France | 305/38 |
| 2378669 | 8/1978 | France . | |
| 2471905 | 12/1979 | France . | |
| 2486482 | 1/1982 | France | 305/57 |
| 55-55063 | 4/1980 | Japan . | |
| 57-144175 | 6/1982 | Japan . | |
| 8502824 | 7/1985 | PCT Int'l Appl. . | |
| 170900 | 10/1934 | Switzerland . | |
| 3500200 | 12/1960 | Switzerland . | |
| 223515 | 10/1924 | United Kingdom . | |
| 1604615 | 12/1981 | United Kingdom . | |
| 2104015 | 3/1983 | United Kingdom . | |

OTHER PUBLICATIONS

Fabricon 81 Brochure, Vannerflex TM, "Cleated Conveyor Belting For Industry", pp. 1–17, Portland, Ore.

Caterpillar, "CAT Challenger 65", Dec. 1986, (brochure).

Mike Osenga, "Caterpillar's New Rubber-Tracked Farm Tractor", Mar. 1987, pp. 25–26, from *Diesel Progress North American* (magazine).

Brendan M. Greeley, Jr., "Caterpillar, Martin Marietta Roll Out Prototype Hard Mobile ICBM Launcher", 9/16/85, pp. 24–25, Aviation Week & Space Technology.

Caterpillar Brochure (undated), entitled "CAT Challenger 65 The Total Field Machine", 12 pages.

ENDLESS TRACK DRIVE SYSTEM

BACKGROUND OF THE INVENTION

This application is a continuation-in-part of U.S. application Ser. No. 049,819, filed May 14, 1987 and now U.S. Pat. No. 4,861,120.

The present invention relates to an endless track drive system. Endless track drive systems are used on vehicles such as tractors, bulldozers and tanks.

Many efforts have been made to improve endless track drive systems. In Edwards U.S. Pat. No. 4,093,318, issued June 6, 1978 (fully incorporated herein by reference), an endless track drive system is disclosed and claimed which includes a plurality of endless track drive sections, each section having a substantially flat contact surface and sloped surfaces to distribute weight and shed dirt and other foreign objects. Although U.S. Pat. No. 4,093,318 represented a marked improvement in endless track drive systems existing prior to that time, the pivotal means of connecting the endless track drive sections was subject to excessive wear, and the endless track drive system there disclosed continued to be excessively costly and time-consuming to make, and it was further found that dirt and foreign objects continued to interfere with proper operation of the endless track drive system, although again not to the extent of track drive systems existing prior thereto.

In further recent developmental work, Edwards and his partners/co-inventors Harper and McNew have further improved upon the endless track drive system disclosed in Edwards U.S. Pat. No. 4,093,318. Their U.S. Pat. Nos. 4,569,561 issued February 11, 1986, and 4,616,883 issued October 14, 1986 (both fully incorporated herein by reference), disclose and claim an endless track drive system made up of a number of drive sections interconnected by cable connector sections. As there disclosed, the drive sections have sloping sides with removable rubber wear pads, and the cable connector sections include cables encased in rubber or other similar suitable material. As a result of such features, the endless track drive system disclosed and claimed therein experiences improved flexibility and tensile strength, reduced noise, and reduced maintenance. The detrimental effects of dirt and debris are likewise mitigated.

Despite the marked improvement in endless track drive systems resulting from the recent work of Edwards, Harper and McNew, as represented in U.S. Pat. Nos. 4,569,561 and 4,616,883, there remained a need for simplification in the manufacture and use of even that improved endless track drive system. Furthermore, the industry is always interested in and receptive to mitigating even further the effects of dirt and debris on endless track drive systems because of the resulting operational problems, downtime and increased maintenance.

SUMMARY OF THE INVENTION

Accordingly, the present invention has been developed to overcome the foregoing shortcomings of the prior most recent improved endless track drive system, and to provide an endless track drive system which has an improved construction, is simpler, less costly and less time-consuming to manufacture and use, and which is less susceptible to interference by dirt and debris.

It is therefore an object of the present invention to provide an endless track drive system with improved construction which is more resistant to contamination by dirt, sand, gravel and other foreign objects.

It is yet another object of the present invention to provide an endless track drive system which can be efficiently and economically manufactured and utilized.

Thus, in accordance with one aspect of the present invention the shortcomings of existing endless track drive systems are overcome by an endless track comprising a plurality of polymeric endless track drive members integrally interconnected in a closed loop to form said endless track, each drive member including at least one frictional drive face, and at least one continuous reinforcement member encased within and further interconnecting said plurality of drive members.

In accordance with another aspect of the present invention, the endless track includes at least one tread member fixed to said plurality of drive members, either integrally, by bonding, or with removable fasteners.

In accordance with yet another aspect of the present invention, an endless track drive system includes the above endless track in conjunction with a drive wheel, the drive wheel including drive surfaces for engaging with the drive faces of said drive members.

In accordance with still another aspect of the present invention, the drive wheel of the endless track drive system further includes a sprocket for engaging with another drive face on each of the drive members, thereby further driving the endless track drive system.

In accordance with still a further aspect of the present invention, means for scraping dirt and debris from the endless track drive system is provided.

These and other aspects and advantages of the present invention are described in or apparent from the following detailed description of the preferred embodiments.

BRIEF DESCRIPTION OF THE DRAWINGS

The preferred embodiments are described with reference to the drawings in which.

DESCRIPTION OF THE PREFERRED EMBODIMENTS

Figure 1:
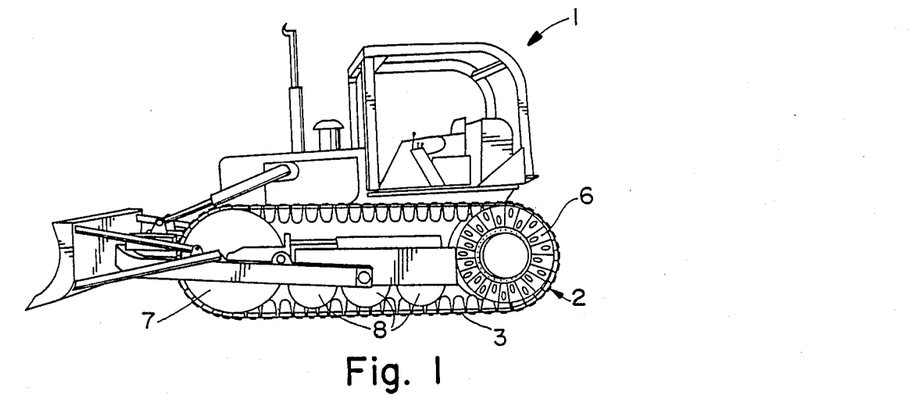
FIG. 1 is a perspective view of a bulldozer equipped with an endless track drive system in accordance with the present invention.

FIG. 1 depicts an endless track drive system 2 of the present invention installed on a bulldozer 1. FIG. 1 depicts only one endless track drive system, but it will be understood that the typical track vehicle is equipped with at least two such systems.

Each endless track drive system 2 is made up of a closed loop endless track 3 in conjunction with the necessary drive wheel 6 and any necessary supporting wheels, such as opposite end wheel 7 and idler wheels or rollers 8. The endless track is installed so as to pass around the wheels 6, 7 and 8. The idler wheels 8 are irregularly spaced so as not to simultaneously engage like points on the endless track, thereby preventing undue vibrations. Of course, the track vehicle is further equipped with the necessary power source and controls to power the endless track drive system 2 and thereby propel the vehicle over varying terrain as desired.

Figure 2:
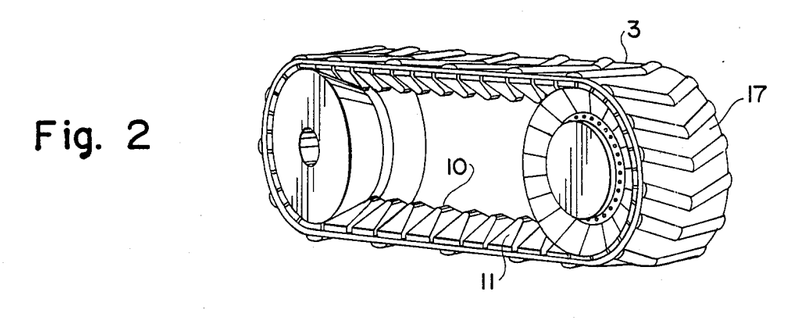
FIG. 2 is a partial enlarged view of the endless track drive system of FIG. 1, including an endless track in accordance with the present invention.
Figure 3:
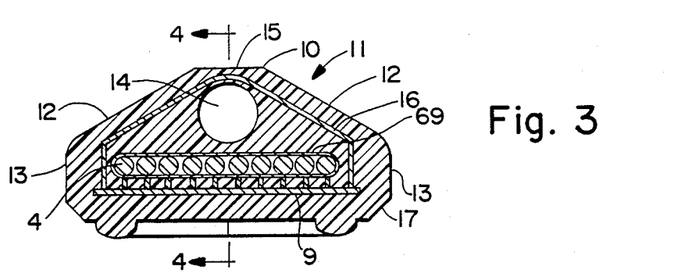
FIG. 3 is a transverse sectional view of the endless track of FIG. 2 taken through one of the drive members thereof.
Figure 4:
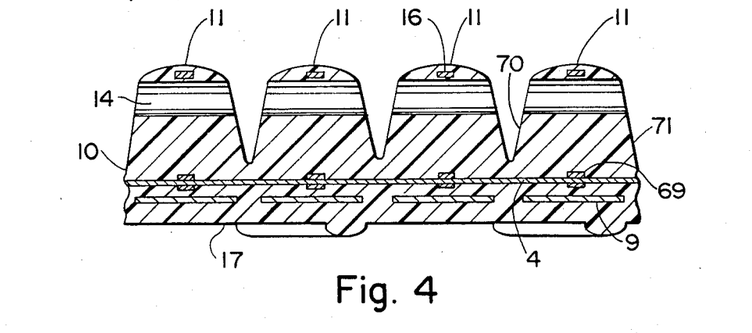
FIG. 4 is a partial longitudinal sectional view of the endless track of FIG. 2 taken along the line 4—4 of FIG. 3.

FIGS. 2-6 depict the endless track 3 in accordance with the present invention. Endless track 3 comprises a continuous, closed loop polymeric structure 10. The polymeric structure is preferably molded, but may be constructed in other ways. The polymeric structure can be formed of any polymeric material which will provide a suitable frictional drive surface with limited operational noise; examples are rubber, polyurethane, or other plastics. As shown in FIGS. 2 and 4, the polymeric structure 10 is formed into a plurality of integrally interconnected polymeric drive members 11.

Figure 5:
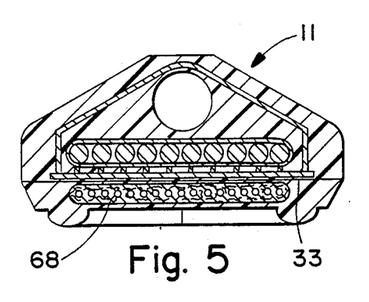
FIG. 5 is a transverse sectional view of the endless track of FIG. 2 similar to FIG. 3 and depicting a bias-ply, fiber reinforced tread member.
Figure 6:
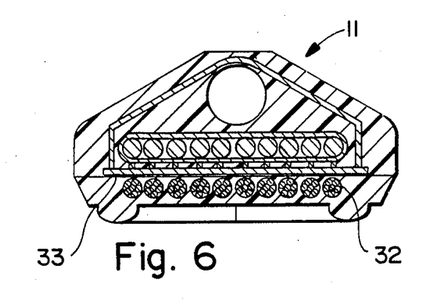
FIG. 6 is a transverse sectional view of the endless track of FIG. 2 similar to FIG. 3 and depicting a cable reinforced tread member.

Encased within the polymeric structure 10 is at least one continuous, closed loop reinforcement member 4, the reinforcement member 4 both reinforcing the endless track 3 and interconnecting adjacent drive members 11 to form the endless track. The reinforcement members 4 are preferably steel cables, but also may be made of other metals or materials such as nylon or other high strength light weight cord. Although ten reinforcement members are depicted in FIGS. 3, 5 and 6, it will be appreciated that any desired number of reinforcement members may be utilized. It will further be appreciated that the reinforcement members 4 must be suspended within the mold prior to the forming of polymeric structure 10 so that reinforcement members 4 may be encased within the polymeric structure.

As depicted, each drive member 11 includes at least one drive face 12. Each drive member 11 preferably is formed with two lateral frictional drive faces 12 which slope inwardly toward one another with respect to a transverse direction of the endless track to form substantially an inverted V-shaped transverse cross-section. The angle of slope of such drive faces is preferably in the range of 30°-45° with respect to horizontal, and most preferably approximately 30°, but other angles of slope also may be chosen and drive members 11 also may be provided with any suitable type, number and configuration of drive faces. For example, each drive member 11 could be provided with two lateral frictional drive faces which slope outwardly with respect to a transverse direction of the endless track, thereby providing drive members 11 with concave V-shaped transverse cross-sections. Other configurations will further be understood from the above disclosure.

An additional upper drive surface 15 also may be formed on each drive member 11 for either frictional drive or sprocket drive by an axle of drive wheel 6 to be described below. Drive members 11 also may have front and rear edges (lateral drive face side edges) 70, 71 which are inwardly sloped with respect to a longitudinal direction of the endless track drive system so that such edges will lie substantially parallel to one another as they proceed around drive wheel 6 of the track vehicle (see FIG. 11), thereby providing smoother operation, permitting use of a sprocket, and further reducing influx of detrimental dirt and debris. The gaps between adjacent drive members resulting from sloped edges 70 and 71 further permit dirt and debris to escape along straight runs of the endless track. Drive members 11 also may be provided with vertically extending planar portions 13 below drive faces 12 so that externally directed portions of drive members 11 will extend beyond the radial peripheries of wheels 6 and 7 thereby raising the track vehicle 1 higher above the terrain to further protect the structural mechanisms of the track vehicle from dirt and debris (see FIG. 14). To reduce the mass of drive track 3, and also reduce consumption of polymeric material and consequent cost, one or more holes 14 also optionally may be formed in each drive member.

Each drive member 11 also optionally may include a base portion 9, and a support structure 16 fastened to each base portion 9 by welding, screws, bolts or other fastening means, in order to further reinforce drive members 11 and render it easier to mold polymeric structure 10. An additional support structure 69 also may be provided for suspending cables 4 above base portions 9 and further securing base portions 9 to polymeric structure 10. Base portions 9 preferably are made of steel or other metal, but may be made of some other strong, rigid material. Support structures 16 and 69 may be in the form of metal straps, or may be made from a rigid plastic material or other suitable rigid substance. Support structure 16 is preferably shaped to conform with the desired configuration of drive faces 12, but may be shaped in other configurations to serve its intended purposes. Support structure 69 likewise may be configured in a number of ways other than as shown.

As depicted in FIGS. 2-6, endless track 3 also preferably includes polymeric tread members 17 which are integrally molded or otherwise integrally formed as part of the endless track (see FIGS. 3 and 4), or are permanently bonded thereto with adhesive or other bonding agent 33 (see FIGS. 5 and 6). Tread members 17 also may include bias-ply, fiber reinforcement layer 68 as depicted in FIG. 5, or may include reinforcing cables 32 of steel or other material as depicted in FIG. 6.

Figure 7:
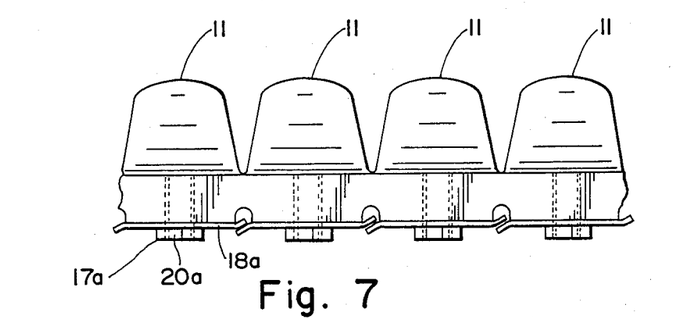
FIG. 7 is a partial longitudinal elevational view of the endless track of FIG. 2 equipped with removable tread members.
Figure 8:
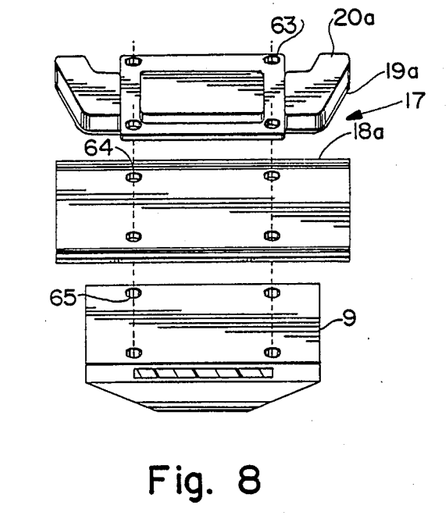
FIG. 8 is an exploded view of an endless track drive member and the removable tread member of FIG. 7.

Alternatively, as depicted in FIGS. 7-10, tread members may be removably fixed to the various drive members 11. For example, removable tread members 17a may each include a metal backing plate 18a and a rubber tread 20a bonded to a metal supporting plate 19a as depicted in FIGS. 7 and 8. As shown in FIG. 8, these individual treads and backing plates each preferably have four unthreaded holes 63 and 64, respectively, and are removably fastened to each of the base portions 9 of drive members 11 with suitable bolts or other fastening means received in threaded holes 65 of the base portions.

Figure 9:
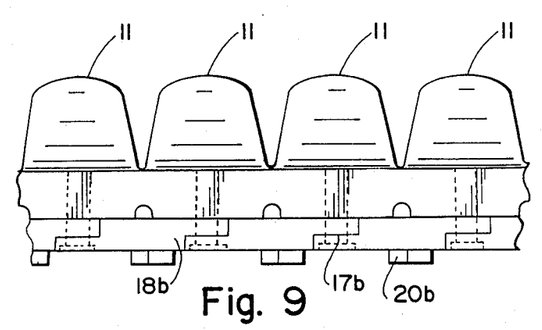
FIG. 9 is a partial longitudinal elevational view of the endless track of FIG. 2 equipped with another type of removable tread member.
Figure 10:
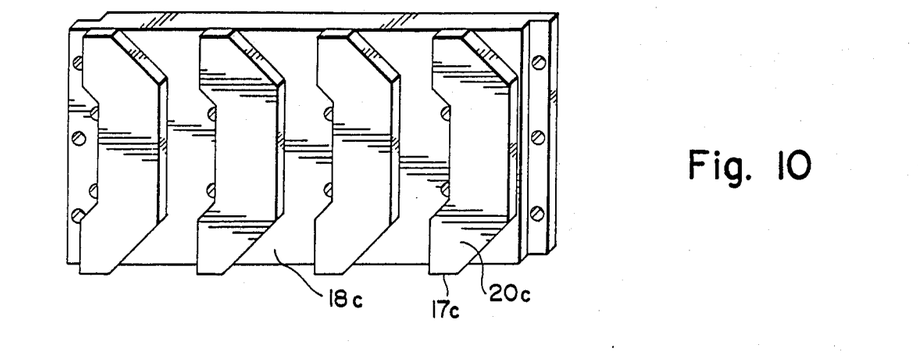
FIG. 10 is a perspective view of yet another removable tread member for use with the endless track of the present invention.

FIG. 9 depicts another type of removable rubber tread member 17b, including a rubber tread 20b molded with a rubber backing plate 18b. Backing plate 18b overlaps with adjacent tread member backing plates, the overlapping ends of adjacent tread member backing plates being fastenable together with bolts or other fastening means into the base portions of corresponding drive members 11. FIG. 10 depicts yet still another removable rubber tread member 17c with a rubber tread 20c and an overlapping rubber backing plate 18c similar to FIG. 9, but having substantially greater length. Of course, any of the polymeric or rubber treads or backing plates may be reinforced with cables or a bias-ply, fiber layer. Furthermore, metal treads also may be utilized, or metal backing plates may be provided with metal grouser bars. The type of tread and backing plate to be utilized, and the material of the chosen tread and backing plate, whether rubber, metal or other material, are functions of manufacture and the type of terrain over which the endless track drive vehicle is to be utilized.

Figure 12:
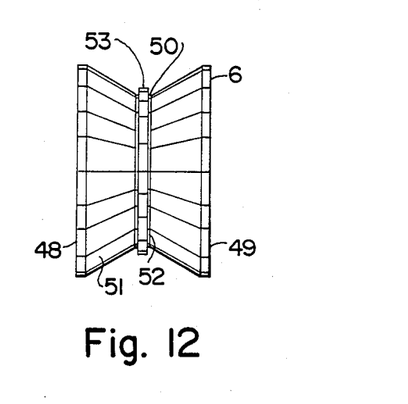
FIG. 12 is a side view of the drive wheel and sprocket of FIG. 11.
Figure 13:
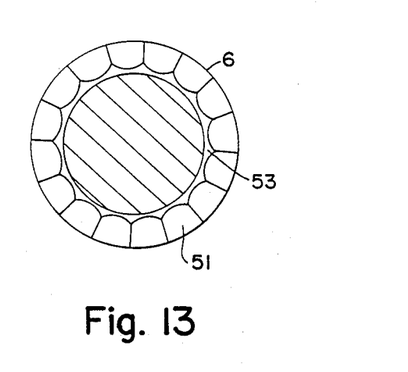
FIG. 13 is a further sectional view of the drive wheel and sprocket of FIG. 11 taken through the drive wheel axle.
Figure 15:
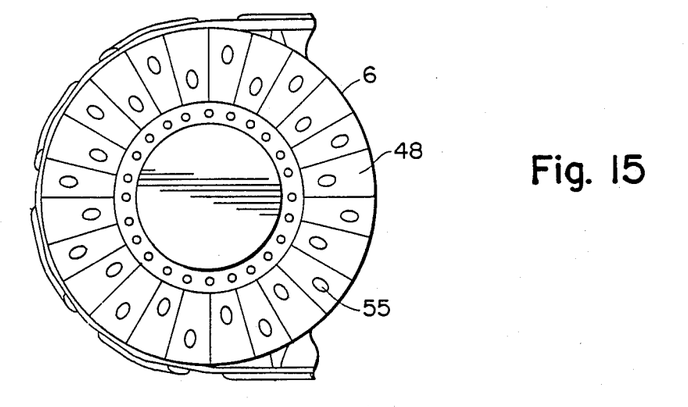
FIG. 15 is an elevational view of a drive wheel in accordance with yet a further embodiment of the present invention incorporating debris escape holes.

FIGS. 12 and 13 depict a drive wheel 6 suitable for use in the endless track drive system in accordance with the present invention. Drive wheel 6 includes first and second side portions 48, 49 connected together by axle portion 50. Each side portion 48, 49 preferably includes interior drive surfaces 51 sloped and shaped to substantially match the angle and shape of drive faces 12 of drive members 11 for engagement therewith. Axle 50 further preferably includes drive surfaces 52, the number, shape and size of which are determined by the configuration of drive members 11, and specifically drive faces 15 thereof which may engage with drive surfaces 52. Although the interior of drive wheel 6 preferably includes drive surfaces 51, 52 as discussed above, axle 50 may be deleted altogether, side portions 48 and 49 then being directly connected to one another, and drive surfaces 51, 52 may also be eliminated. Furthermore, wheels 7 and 8 of track vehicle 1 may or may not contain interior drive surfaces corresponding to drive surfaces 51 and 52 of drive wheel 6. Drive wheel 6 may also contain holes 55 as shown in FIG. 15 to permit escape of dirt and debris, as may wheels 7 and 8 as well.

Figure 11:
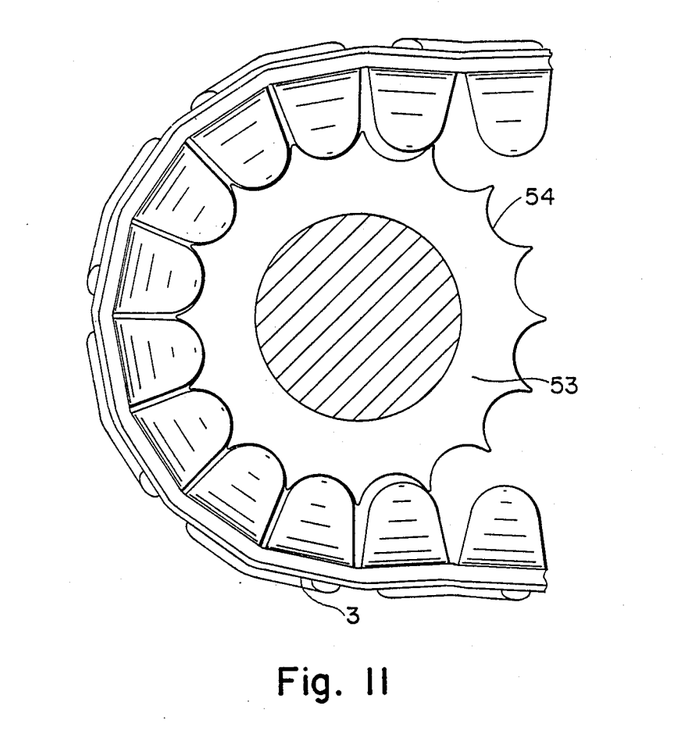
FIG. 11 is a sectional view taken through an axle of a drive wheel in accordance with an embodiment of the present invention depicting the endless track engaged with a sprocket.
Figure 14:
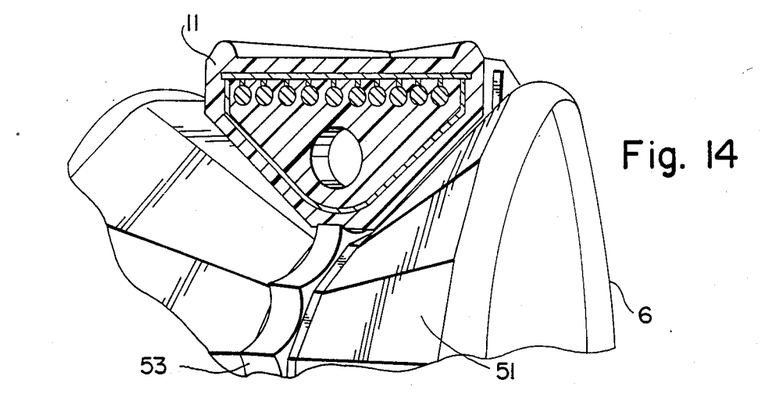
FIG. 14 is a perspective view, partially in cross-section, depicting the endless track of FIG. 2 in position on the drive wheel of FIGS. 11-13.

As depicted in FIGS. 11-13, drive wheel 6 may also include a sprocket 53 for further driving the endless track drive system. Sprocket 53 includes concave drive surfaces 54 which are configured for engagement with drive surfaces 15 of drive members 11. FIG. 14 depicts a drive member 11 of drive track 3 engaging with interior drive surfaces 51 and sprocket 53 of drive wheel 6.

Of course, the sprocket may take other forms. For example, rounded bars may be added between drive surfaces 51 of drive wheel side portions 48,49 to interfit between adjacent drive members to provide positive engagement therewith. By way of yet a further example, drive pins may be provided extending from the tops of the drive members for positive engagement with spaced recesses in the drive wheel axle. Other possible sprocket arrangements will be appreciated from the above disclosure.

Figure 17:
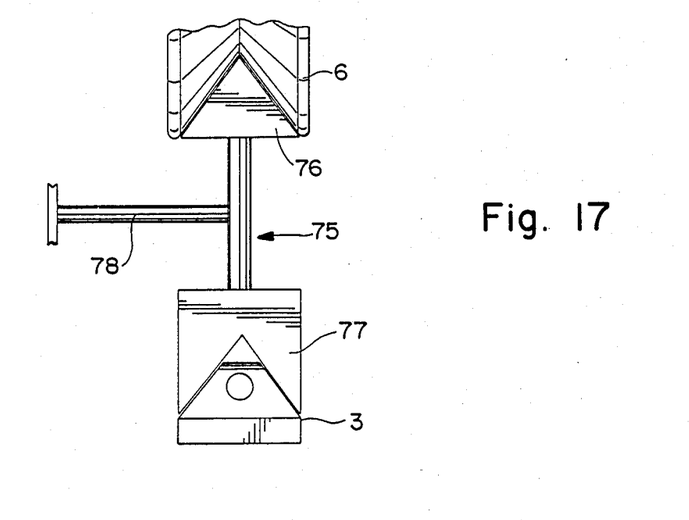
FIG. 17 is an elevational view of a scraper tool usable with the endless track drive system of the present invention.

As depicted in FIG. 17, the endless track drive system also may be provided with a scraper or sweeper 75 for removing dirt and debris from drive wheel 6 and the various drive faces on the drive members of the endless track. For example, scraper 75 may include an upwardly directed convex, inverted V-shaped scraper blade 76 and a downwardly directed concave, inverted V-shaped scraper blade 77 supported by a bracket 78 affixed on a supporting surface of the endless track drive vehicle. Thus, scraper 75 can be located so as to clean the drive wheel and endless track simultaneously, thereby preventing dirt and debris from interfering with the operation of the endless track drive system. With the structure shown in FIG. 17, any dirt scraped from drive wheel 6 will fall and be diverted by scraper blade 77 instead of becoming entrapped in the endless track. Of course, scraper 75 may be located at various positions on the endless track drive vehicle, may be provided with scraper blade 76 or 77 alone, and may be of a configuration other than as shown. Additionally, bristles, brushes or other cleaning instruments may be utilized in lieu of scraper blades 76 and 77.

The above-described endless track drive system is easy and cost-effective to manufacture. Optional base portions 9 of drive members 11 can be forged, cast or otherwise manufactured to the desired size, and optional support structures 16 and 69 can be affixed thereto by conventional means. Reinforcement members 4 can be suspended above a desired plurality of base portions 9, or otherwise suspended within a mold or other forming apparatus, and a suitable polymeric material molded or otherwise formed to encase the reinforcement members and provide a plurality of integral, interconnected drive members and tread members of desired configuration. Drive wheel 6 and sprocket 53 likewise easily can be manufactured through the use of known manufacturing techniques based upon the above disclosure of those features of the present invention.

The above-described endless track drive system is also easy and cost-effective to utilize. Since, in its preferred embodiment, the various drive members and tread members are integrally molded and interconnected into a single, closed loop endless track, the endless track can be simply installed and removed as a unit. Since the endless track is molded of a polymeric substance, with optional holes through the drive members to reduce polymeric mass, the endless track is relatively light-weight for ease and efficiency of installation and removal.

In accordance with the above, an improved endless track drive system is provided which can be easily and cost-effectively constructed and utilized, and which provides excellent operability.

Figure 16A:
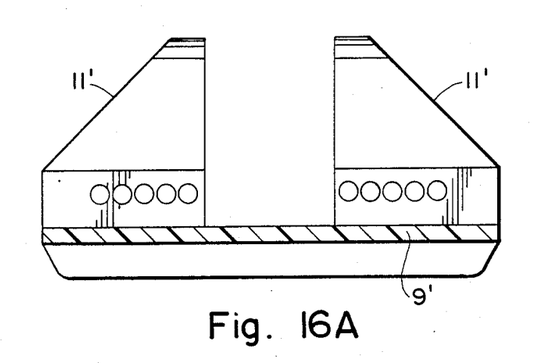
FIG. 16A is an elevational view of an endless track drive member in accordance with yet a further embodiment of the present invention.
Figure 16B:
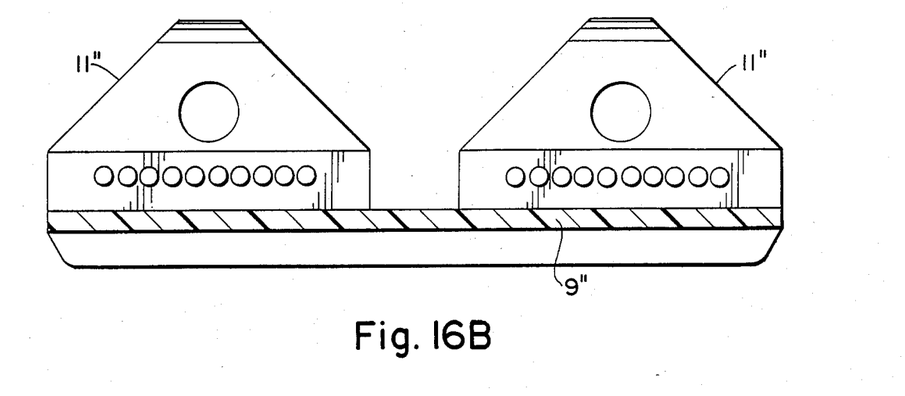
FIG. 16B is an elevational view of an endless track drive member in accordance with still a further embodiment of the present invention.

Obviously, many modifications and variations to the disclosed endless track drive system are possible in light of the above teachings. For example, wider base portions 9', 9" can be provided as depicted in FIGS. 16A and 16B to provide for vehicles requiring wider endless tracks. In such cases, the polymeric endless track drive members can each be molded in the form of half members 11' or double members 11". Drive members 11' can be driven by a wider drive wheel or two properly spaced pneumatic driving tires. Drive members 11" can be driven by two properly spaced drive wheels or four properly spaced pneumatic drive tires. Of course, the described tread members and scraper would have to be reconfigured accordingly to coordinate with drive members 11' and 11". It is to be further understood that, within the scope of the appended claims, the invention also may be practiced otherwise then as specifically described. For example, the various aspects of the invention may be selected for combination in a number of permutations other than those shown and described.

Thus, while only certain embodiments of the invention have been specifically described herein, it will be apparent that numerous modifications may be made thereto without departing from the spirit and scope of the invention.

What is claimed is:

1. An endless vehicle track comprising:
   a plurality of polymeric endless track drive members integrally formed in a closed loop to form said endless vehicle track, each said drive member including at least two lateral frictional drive faces sloping inwardly with respect to a transverse direction of said endless vehicle track and serving as means for frictionally driving an endless track vehicle, lateral frictional drive faces of adjacent drive members being spaced apart in a longitudinal direction of said endless vehicle track by less than a longitudinal length of each of said lateral frictional drive faces; and
   at least one substantially continuous reinforcement member substantially entirely encased within said endless vehicle track.

2. The endless vehicle track of claim 1, further comprising at least one tread member fixed to said plurality of drive members and extending in a direction opposite from said lateral frictional drive faces.

3. The endless vehicle track of claim 2, said at least one tread member being bias-ply, fiber reinforced.

4. The endless vehicle track of claim 2, said at least one tread member being cable reinforced.

5. The endless vehicle track of claim 2, said at least one tread member being integrally formed with said plurality of drive members.

6. The endless vehicle track of claim 2, said at least one tread member being bonded to said plurality of drive members.

7. The endless vehicle track of claim 2, said at least one tread member being removably fastened to said plurality of drive members.

8. The endless vehicle track of claim 7, a separate tread member being removably fastened to each drive member.

9. The endless vehicle track of claim 7, said at least one tread member comprising a plurality of tread members, overlapping ends of said tread members being together removably fastened to corresponding drive members.

10. The endless vehicle track of claim 2, side edges of said lateral frictional drive faces sloping inwardly with respect to a longitudinal direction of said endless track.

11. The endless vehicle track of claim 1, each said drive member further including a generally horizontal upper surface between said at least two inwardly sloping lateral frictional drive faces.

12. The endless vehicle track of claim 1, each said drive member having at least one hole therein to reduce the polymeric mass of said drive member.

13. The endless vehicle track of claim 1, each said drive member further comprising a base portion and support structure extending from said base portion.

14. The endless vehicle track of claim 13, said support structure comprising a strap with two side wall portions sloping inwardly with respect to a transverse direction of said endless vehicle track.

15. The endless vehicle track of claim 13, said support structure comprising a strap fixing said at least one continuous reinforcement member to said base portion.

16. The endless vehicle track of claim 1, each said drive member further including a generally horizontal upper surface between said at least two inwardly sloping lateral frictional drive faces.

17. The endless vehicle track of claim 1, each said drive member further including an upper drive face, said upper drive face being narrower at an uppermost point than at a lowermost point as viewed in a transverse direction of said drive member.

18. The endless vehicle track of claim 1, further comprising at least one tread member removably fastened to said endless vehicle track and extending in a direction opposite from said drive members, said at least one removable tread member comprising a polymeric tread bonded to a metal supporting plate which is fastened to said endless track with a metal backing plate sandwiched therebetween.

19. The endless vehicle track of claim 18, said polymeric tread comprising three tread portions bonded to said metal supporting plate in a transverse direction of said endless track, with spaces between adjacent tread portions to allow escape of dirt and debris.

20. The endless vehicle track of claim 19, said at least one removable tread member being substantially U-shaped in plan view.

21. The endless vehicle track of claim 1, said at least one reinforcement member being situated below bottom edges of said lateral frictional drive faces of said drive members when said drive members are in contact with the ground.

22. An endless vehicle track comprising:
   a plurality of polymeric endless track drive members integrally formed in a closed loop to form said endless vehicle track, each said drive member including at least two lateral frictional drive faces sloping inwardly with respect to a transverse direction of said endless vehicle track, said lateral frictional drive faces of adjacent drive members being spaced apart in a longitudinal direction, and member substantially entirely encased within said endless vehicle track.

23. The endless vehicle track of claim 22, said at least one reinforcement member being situated below bottom edges of said lateral frictional drive faces of said drive members when said drive members are in contact with the ground.

24. The endless vehicle track of claim 22, each said drive member further including a generally horizontal upper surface between said at least two inwardly sloping lateral frictional drive faces.

25. An endless track drive system for a tracked vehicle comprising:

an endless vehicle track including a plurality of polymeric endless track drive members integrally formed in a closed loop to form said endless vehicle track, and at least one substantially continuous reinforcement member substantially entirely encased within said endless vehicle track, each said drive member including at least two lateral frictional drive faces sloping inwardly with respect to a transverse direction of said endless vehicle track and serving as means for frictionally driving an endless track vehicle, lateral frictional drive faces of adjacent drive members being spaced apart in a longitudinal direction of said endless vehicle track by less than a longitudinal length of each of said lateral frictional drive faces; and a drive wheel for driving said endless vehicle track, said drive wheel including at least two drive surfaces for engaging with said at least two lateral frictional drive faces of each said drive member.

26. The endless track drive system of claim 25, said drive wheel including a plurality of drive surfaces, each said drive surface being shaped to substantially match the shape of a lateral frictional drive face of said drive members for frictional engagement therewith.

27. The endless track drive system of claim 26, said drive wheel including first and second side portions and an axle portion connecting said first and second side portions, and each said drive member including an upper frictional drive face between said at least two lateral frictional drive faces, said axle portion of said drive wheel including a plurality of drive surfaces for frictional engagement with said upper frictional drive faces.

28. The endless track drive system of claim 26, said drive wheel further comprising sprocket means for further driving said drive members.

29. The endless track drive system of claim 28, said drive wheel including first and second side portions and an axle portion connecting said first and second side portions, and each said drive member including an upper drive face between said at least two lateral frictional drive faces, said axle portion of said drive wheel including a sprocket shaped to substantially match and engage with said upper drive faces.

30. The endless track drive system of claim 25, said drive wheel including a plurality of holes for escape of debris.

31. The endless track drive system of claim 25, further comprising scraper means for scraping dirt and debris from said endless vehicle track.

32. The endless track drive system of claim 31, said scraper means including means for simultaneously scraping dirt and debris from said drive wheel and said endless track.

33. The endless track drive system of claim 25, side edges of said lateral frictional drive faces sloping inwardly with respect to a longitudinal direction of said endless vehicle track.

34. The endless track drive system of claim 25, said drive wheel being incompressible.

35. The endless track drive system of claim 25, each said drive member further including a generally horizontal upper surface between said at least two inwardly sloping lateral frictional drive faces.

36. The endless track drive system of claim 25, said at least one reinforcement member being situated below bottom edges of said lateral frictional drive faces of said drive members when said drive members are in contact with the ground.

* * * * *

UNITED STATES PATENT AND TRADEMARK OFFICE
CERTIFICATE OF CORRECTION

PATENT NO. : 4,906,054
DATED : March 6, 1990
INVENTOR(S) : EDWARDS et al

It is certified that error appears in the above-identified patent and that said Letters Patent is hereby corrected as shown below:

Col. 8, line 53, claim 22, line 7, delete "said" (second occurrence).
Col. 8, line 55, claim 22, line 9, after "and" insert
--said lateral frictional drive faces of said plurality
of drive members serving as substantial means for frictionally
driving an endless track vehicle; and
   at least one substantially continuous reinforcement--

Signed and Sealed this

Ninth Day of June, 1992

Attest:

DOUGLAS B. COMER

Attesting Officer

Acting Commissioner of Patents and Trademarks